United States Patent [19]

Honda

[11] Patent Number: 4,668,210
[45] Date of Patent: May 26, 1987

[54] V-BELT
[75] Inventor: Shoichi Honda, Tokyo, Japan
[73] Assignee: Honda Giken Kogyo Kabushiki Kaisha, Tokyo, Japan
[21] Appl. No.: 748,494
[22] Filed: Jun. 25, 1985
[30] Foreign Application Priority Data
Jun. 27, 1984 [JP] Japan .................. 59-132643
[51] Int. Cl.[4] ................ F16G 1/22; F16G 5/18
[52] U.S. Cl. ................... 474/242; 474/245
[58] Field of Search ............ 474/242, 244, 245-249, 474/201, 265

[56]   References Cited
U.S. PATENT DOCUMENTS 2,279,134  4/1942  Dalrymple ............... 474/242 X
3,572,148  3/1971  Hebert .................. 474/245
3,916,709  11/1975 Steuer et al. ........... 474/242

FOREIGN PATENT DOCUMENTS 0337448  5/1921  Fed. Rep. of Germany ...... 474/245

Primary Examiner—Stephen J. Novosad
Assistant Examiner—Thuy M. Bui
Attorney, Agent, or Firm—Lyon & Lyon

[57]   ABSTRACT

A link-type V-belt having links of parallel link plates. Each link includes a transverse block for accommodating the compressive stress imposed by the V-belt running through a pulley. Aprons on the link plates extend to define bearing plate portions at either end of the transverse block. These bearing plate portions define the V-belt configuration by being inwardly inclined. Intermediate link plates within each link also act by means of block supporting holes to locate the blocks between the bearing support portions. Pins join the links together to form a continuous belt.

10 Claims, 12 Drawing Figures

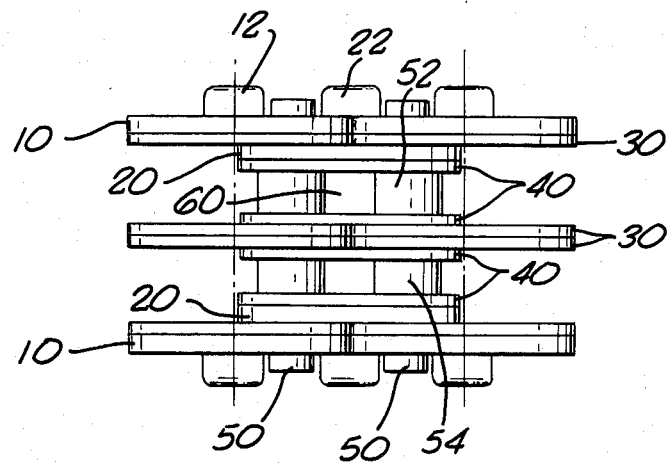
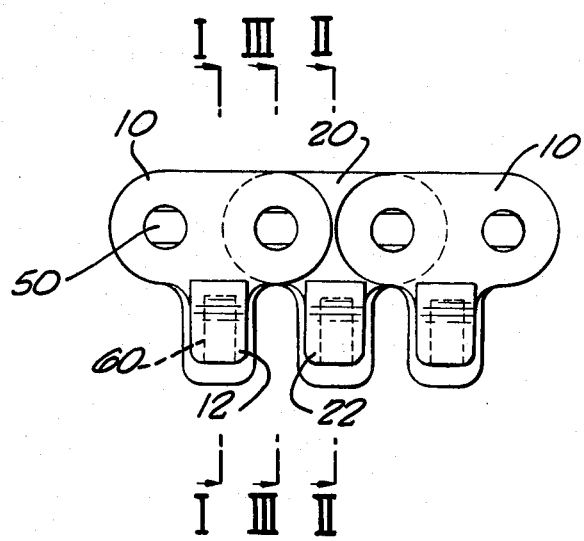

V-BELT

BACKGROUND OF THE INVENTION

The scope of the present invention is link-type V-belts.

Link-type V-belts having link plates pinned together to retain the links in a continuous belt and employing transversely mounted blocks to define the V-belt configuration have been previously employed. Such an earlier device is illustrated in FIGS. 10, 11 and 12 herein. In this prior arrangement, the power transmission block a of each link is adapted to engage with a V-groove b, illustrated in phantom, as can be seen in FIG. 12. The links are defined by link plates c or d with the link plates d being nested alternately within the link plates c at attachment locations where pins e retain the links in a continuous belt. The power transmission blocks a extend through block supporting holes in the links c and d in a mounting portion of each link plate displaced laterally from between the attachment holes receiving the pins e. The power transmission blocks a include a step portion fit between the link plates c or d to retain the blocks in position in each link.

When the device illustrated in FIGS. 10, 11 and 12 is employed to transmit significant power, each of the power transmission blocks a has its end faces engaged directly and frictionally with the V-groove b. Side pressures Fi from the V-groove faces act as compressive stresses upon each power transmission block a to develop frictional forces parallel to the interface between the power transmission blocks a and the V-groove b. Thus, a tangential force Wi for transmitting power through the belt acts as a bending moment M upon each power transmission block a when positioned within the V-groove b. As a result, the power transmission blocks a directly receive the high stress composed of the compressive stresses Fi and the bending moment M. These stresses define the maximum transmission torque available with such a belt.

In order to increase the maximum driving torque which can be sustained by such a V-belt configuration, one could conceive of increasing the thickness of the power transmission block a. By doing so, however, the link plates c and d must have their dimensions correspondingly reduced in order to accommodate the limitation on space. This in turn results in a weakening of the link plates. It is also conceivable to enlarge the pitch of the belt. However, such an enlargement increases the minimum winding radius, enlarges the entire power transmission and reduces the density of contact between the pulley b and the power transmission blocks a. Clearly the various constraining requirements of such a link-type V-belt system limit the strength or effectiveness of the transmission.

SUMMARY OF THE INVENTION

The present invention is directed to high-strength link-type V-belt mechanisms with substantial transmission torque capability. With the present invention, the forces exerted between the V-groove of a drive or driven pulley and the individual links of the V-belt are distributed through the belt components to reduce concentrated loading of specific components. As a result, added load can be sustained by the belt assembly. Wear on contacting surfaces may also be reduced without compromising belt strength.

To accomplish the foregoing, the links of the V-belts have link plates and blocks transversely mounted for withstanding the compressive stress when engaged with the V-groove of a pulley with the link plates having bearing plate portions between which the blocks extend. The bearing plate portions then define the engaging surfaces mating with the associated V-groove. As a result, compressive stresses Fi are received by the block structure while tangential forces Wi are disbursed through additional elements of the link. Consequently, the bending stresses acting upon the power transmission blocks may be reduced.

Accordingly, it is an object of the present invention to provide an improved link-type V-belt. Other and further objects and advantages will appear hereinafter.

BRIEF DESCRIPTION OF THE DRAWINGS

FIG. 4 is a plan view of a portion of a link-type V-belt.

FIG. 5 is a side view of a portion of a link type V-belt.

DETAILED DESCRIPTION OF THE PREFERRED EMBODIMENT

Turning in detail to the drawings, a link-type V-belt as best illustrated assembled in FIGS. 4 and 5 is composed of exterior link plates arranged in the present embodiment as including outer link plates 10 and inner link plates 20. The outer and inner link plates 10 and 20 alternate in the V-belt arrangement such that the inner link plates 20 nest between the outer link plates 10 in linking position. Additional link plates 30 and 40 are located inwardly of the outer link plates 10 or inner link plates 20. Pins 50 cooperate with the link plates 10 and 20 to retain the links in a continuous belt.

Figure 1:
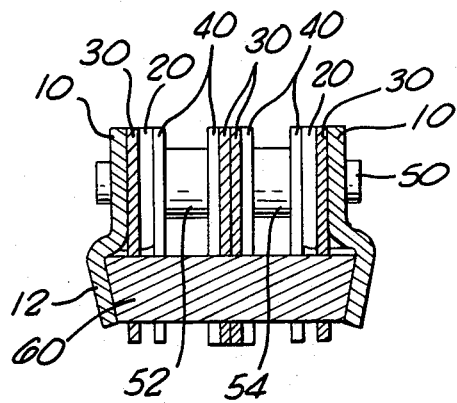
FIG. 1 is a cross-sectional end view taken along line I—I of FIG. 5.
Figure 2:
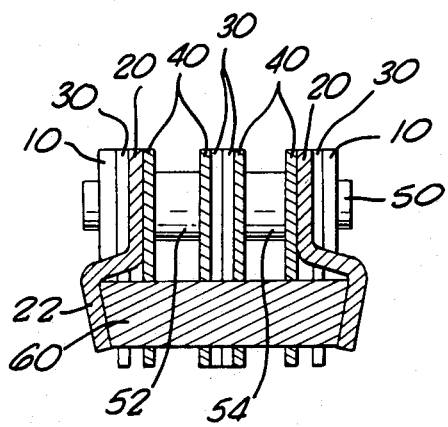
FIG. 2 is a cross-sectional end view taken along line II—II of FIG. 5.
Figure 3:
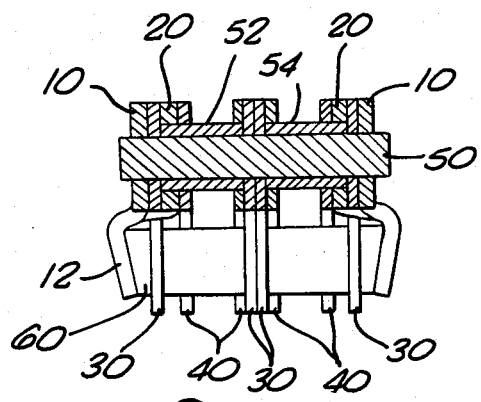
FIG. 3 is a cross-sectional end view taken along line III—III of FIG. 5.
Figure 6:
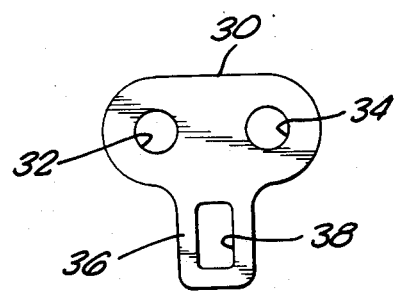
FIG. 6 is a side view of an interior link plate.

The link plate 30 is illustrated in FIG. 6 as including spaced attachment holes 32 and 34. Offset from between the spaced attachment holes 32 and 34 laterally therefrom is an apron 36. Extending through the apron 36 is a block supporting hole 38 sized to accommodate a compression block as will be described below. As can be seen in FIGS. 1, 2 and 3, link plates 30 are employed in four locations in the links which are defined by the outer link plates 10. It can also be seen from these Figures that two of the link plates 30 are mutually displaced toward the outside of the link. Two of the plates 30 are also shown to be located centrally in the link. The spaced attachment holes 32 and 34 are sized to fit the diameter of the pin 50.

Figure 7:
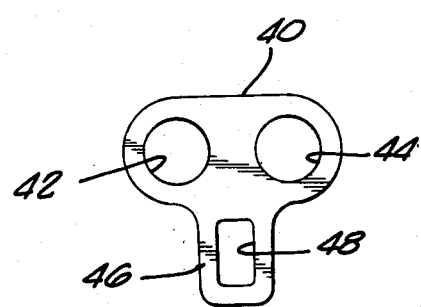
FIG. 7 is a side view of an interior link plate.
Figure 8:
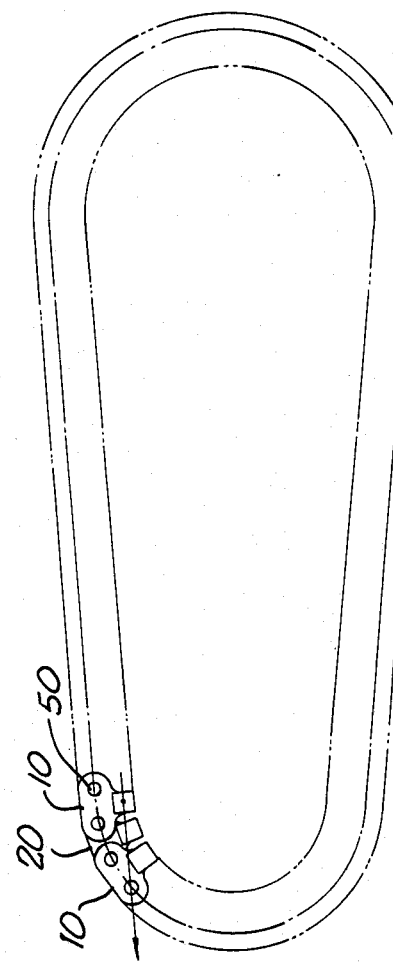
FIG. 8 is a side view illustrating a plurality of links in a belt.

The link plate 40 is illustrated in FIG. 7 as including spaced attachment holes 42 and 44. The plate 40 also includes an apron 46 having a block supporting hole 48 extending therethrough. The location of the plates 40 may also be discerned from FIGS. 1, 2 and 3. The plates 40 are associated with the links defined by the inner link plates 20. Two of the link plates 40 are mutually displaced outwardly toward the sides of the links while two of the link plates 40 are generally positioned centrally within the links. The spaced attachment holes 42 and 44 of the link plate 40 are enlarged in size to accommodate sleeves 52 and 54 located about the pin 50. The link plates associated with the link which includes the inner link plates 20 all receive either sleeve 52 or sleeve 54. Thus, the sleeves 52 and 54 may rotate relative to the pin 50 with the inner link plates 20. The pin 50 may rotate with the outer link plates 10 with relative rotation occurring between the pin 50 and the sleeves 52 and 54.

Blocks 60 are arranged in each link. The blocks 60 extend transversely to the longitudinal direction of the V-belt defined by the links. The block supporting holes 38 and 48 in the link plates 30 and 40 receive the blocks 60. Thus, the blocks are located and retained with each block 60 being retained in a fixed orientation relative to its associated link. The outer ends of the blocks 60 are inclined at an angle to accommodate predetermined pulley angles. The blocks 60 are of sufficient cross-sectional dimension to provide compressive strength to resist the forces Fi imposed on a working link.

The outer plates 10 and the inner plates 20 each include depending skirts which define bearing plate portions 12 and 22, respectively. The bearing plate portions 12 and 22 are each displaced outwardly from the attachment portions of the plates 10 and 20. As a result, the outermost portion of the V-belt may be the bearing plate portions. These bearing plate portions 12 and 22 are also inclined at an angle similar to that of the ends of the blocks 60. The blocks 60 extend out to abutt against the inner surfaces of the bearing plate portions 12 and 22 to provide an assembly rigid in transverse compression. Thus, the forces Fi imposed by a V-groove are transmitted through the bearing plate portions 12 or 22 and into the block 60.

Figure 9:
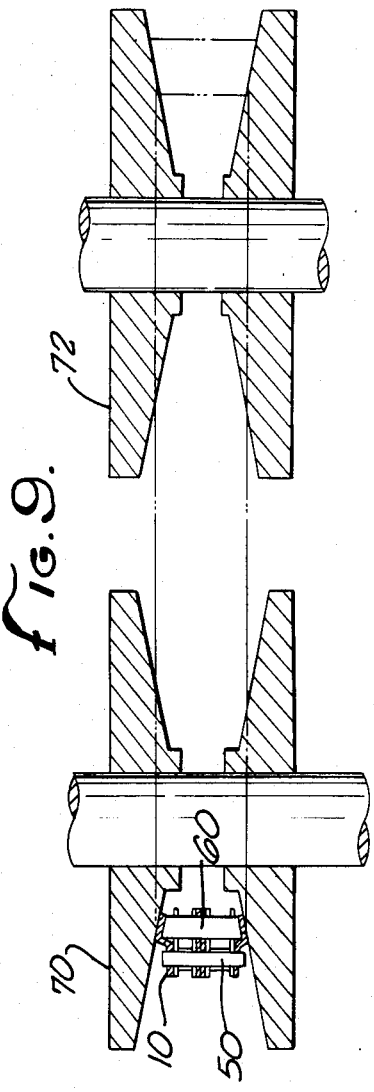
FIG. 9 is a cross-sectional plan of a power transmission using a link-type V-belt.
Figure 10:
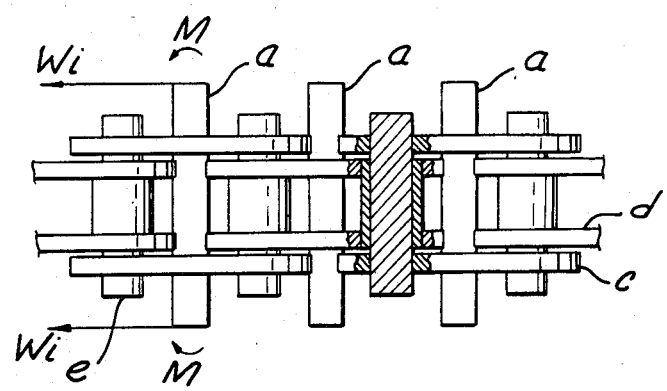
FIG. 10 is a plan view of a prior art link-type V-belt.
Figure 11:
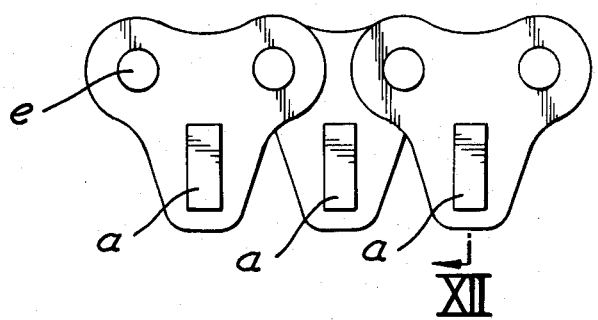
FIG. 11 is a side view of a prior art link-type V-belt.
Figure 12:
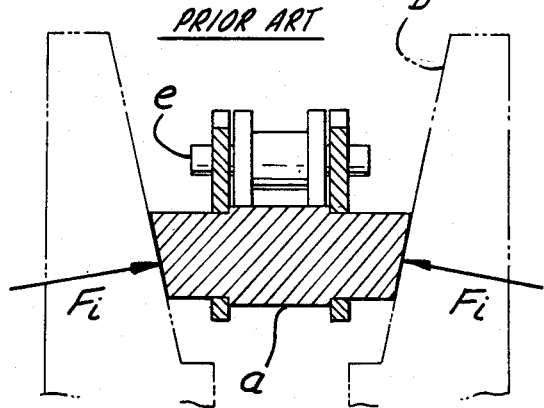
FIG. 12 is a cross-sectional end view taken along line XII—XII of FIG. 11.

In operation, the link-type V-belt is wound about pulleys 70 and 72 as seen in FIG. 9. The side pressures Fi from the pulleys act upon the bearing plate portions 12 and 22 of the link plates 10 and 20. This side pressure is imposed upon the power transmission blocks 60 through the bearing plate portions to place the links effectively in compression against the pulleys 70 and 72. This compression provides a frictional force to accommodate the transmission of the tangential force Wi between the drive pulley and the bearing plate portions of the V-belt. The tangential force Wi is transmitted, at least in part, to the pins 50, the sleeves 52 and the link plates 30 and 40 as well as partially upon the block 60. By distributing the load among all components as well as to the power transmission blocks 60 the moments which would otherwise be placed upon the transmission blocks 60 alone are reduced. Consequently, increased torque capability for the link-type V-belt is achieved.

With this arrangement, the same time, the areas of the bearing plate portions 12 and 22 do not require a reduction in the size of other components even if the bearing plate portions are enlarged beyond that of the ends of the blocks 60. The greater surface area can provide improves wear on the belt and pulleys and does not weaken the overall structure of the belt.

In addition, substantial compressive stress continues to be applied to the blocks 60. The location of the blocks 60 by means of the bearing plate portions 12 and 22 eliminates the need for a step in the block 60. Consequently, stress within the block is evenly distributed rather than being concentrated at the step required in prior devices. As a result, the likelihood of stress fracture at the step is eliminated.

Accordingly, an improved link-type V-belt is thus disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A V-Belt comprising
   a plurality of links, each said link including two first link plates having spaced attachment holes, and a first block extending transversely of said first link plates, said first link plates each having a bearing plate portion, said block extending between said bearing plate portions of said two first link plates, said bearing plate portions being laterally offset from between said spaced attachment holes;
   a second link plate having spaced attachment holes and a block supporting hole, said second link plate being located between said first link plates and said block extending through said block supporting hole; and
   pins extending through said attachment holes to retain said links in a continuous belt.

2. The V-belt of claim 1 wherein each said link includes a plurality of said second link plates.

3. The V-belt of claim 2 wherein two said second link plates are mutually displaced toward the ends of said block.

4. The V-belt of claim 3 wherein at least one said second link is centrally positioned in said link.

5. The V-belt of claim 1 wherein said bearing plate portions are inclined inwardly to define a V-belt configuration.

6. A V-belt comprising
   a plurality of links, each said link including two first link plates having spaced attachment holes, at least one second link plate having spaced attachment holes and a block extending transversely of said first link plates and at least one said second link plate, said first link plates each having a bearing plate portion laterally offset from between said two attachment holes, said second link plate having a block supporting hole laterally offset from between said two attachment holes, said block extending between said bearing plate portions of said two first link plates and through said block supporting hole of said second link plate; and
   pins extending through said attachment holes to retain said links in a continuous belt.

7. The V-belt of claim 6 wherein said bearing plate portions are inclined inwardly to define a V-belt configuration.

8. The V-belt of claim 6 wherein each said link includes a plurality of said second link plates.

9. The V-belt of claim 8 wherein two said second link plates are mutually displaced toward the ends of said block.

10. A V-belt comprising
    a plurality of links, each said link including two first link plates having spaced attachment holes, a plurality of second link plates having spaced attachment holes and a block extending transversely of said first link plates and said second link plates, said first link plates each having a bearing plate portion, said second link plates each having a block supporting hole, two said second link plates being mutually displaced toward said first link plates, at least one said second link plate being located centrally of said link, said block extending between said bearing plate portions of said two first link plates and through said block supporting holes of said second link plates, said bearing plate portions being inclined inwardly to define a V-belt configuration, said bearing plate portions and said block supporting holes being laterally offset from between said two attachment holes of said first and second link plates; and pins extending through said attachment holes to retain said links in a continuous belt.

* * * * *